Dec. 17, 1957     S. I. RAMBO     2,816,445
STROBOSCOPIC BALANCE TESTER
Filed Aug. 17, 1953
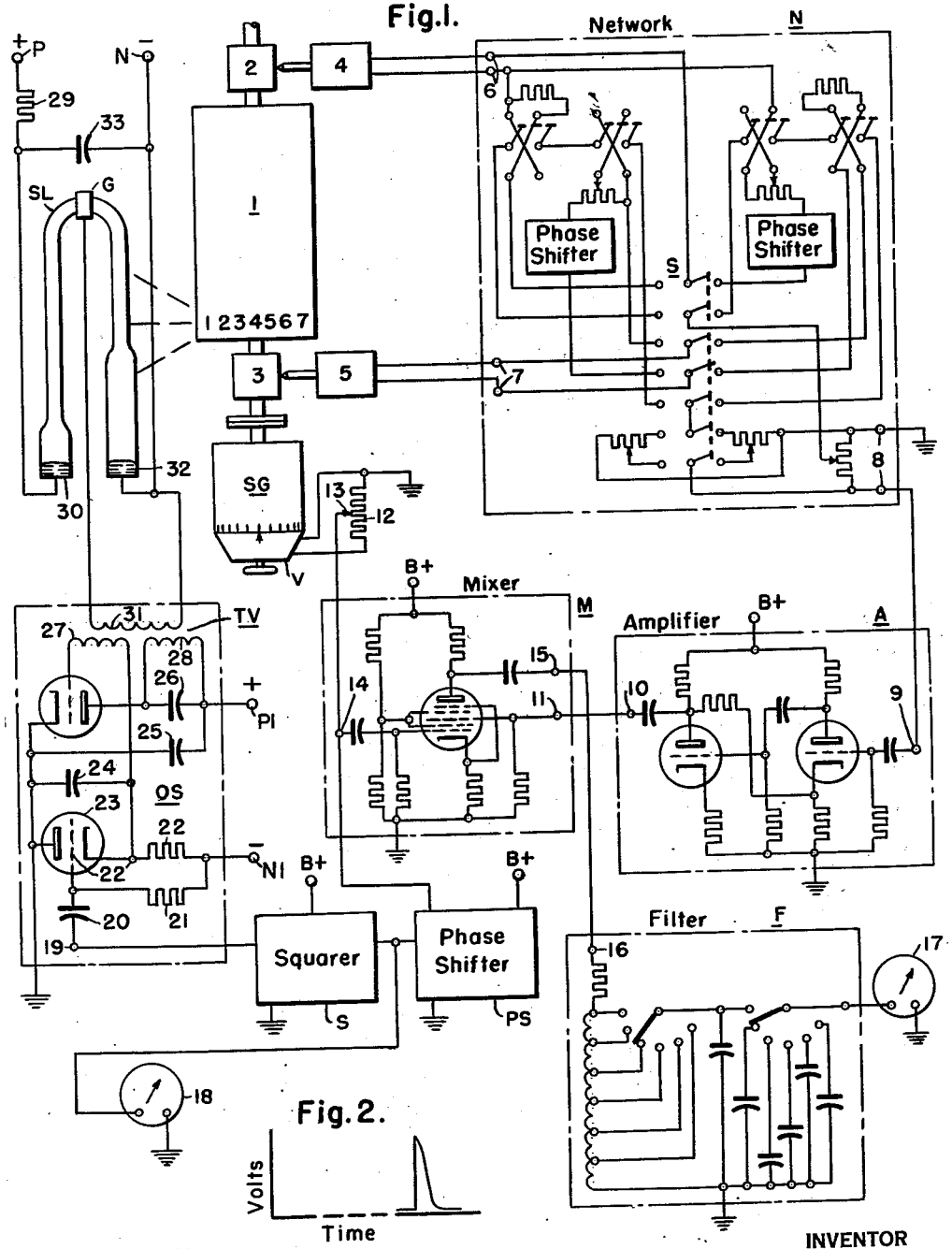
INVENTOR
Sheldon I. Rambo.

United States Patent Office 2,816,445
Patented Dec. 17, 1957

2,816,445
STROBOSCOPIC BALANCE TESTER

Sheldon Ivan Rambo, Baltimore, Md., assignor to Westinghouse Electric Corporation, East Pittsburgh, Pa., a corporation of Pennsylvania Application August 17, 1953, Serial No. 374,553

6 Claims. (Cl. 73—466)

In the balancing machine art, it is important to know both the magnitude of the unbalance of a rotor in a given correction plane and the exact angular position of the unbalance in the correction plane.

Balancing machines employing stroboscopic lights for detection of the unbalance point have been in use for quite some time. The advantages of the stroboscopic unbalance detection method, particularly for small rotors, are well known to those skilled in the art.

In the past, lamps of the neon gas type have been employed. Several serious limitations have been found in this type of lamp. Light intensity is low, lamp life is short at best, and is still shorter when the light output on such a lamp is increased. Because the required triggering voltage is low, the lamps are often, under actual operating conditions in balancing machines, susceptible to external influences which cause them to fire at random or in synchronism with undesired signals.

One broad object of my invention is the provision of systems of control including a stroboscopic lamp and triggering means that eliminate the shortcomings of the stroboscopic unbalance detection method of the past.

A still more specific object of my invention is the provision of an improved stroboscopic effect in a balancing machine by the use of a stroboscopic lamp having a high light output for a short time period, and by triggering such a lamp in synchronism with an unbalance signal.

Other objects and advantages will become more apparent from a study of the following specification and the accompanying drawing, in which:

Figure 1 is a diagrammatic showing of my invention as applied to a balancing machine and its associated electric circuitry; and Fig. 2 shows a curve showing an operating characteristic of certain apparatus included in my invention.

To gain a better understanding of my contribution to the art, I shall first briefly describe the balancing machine and its associated circuitry.

The rotor 1 to be balanced is mounted for rotation in bearings 2 and 3 which are mounted for free oscillation in a horizontal plane, which is the plane of the paper of the showing in the drawing. A pair of pickups 4 and 5 are associated with the bearings to produce an electric signal indicative of the magnitude of unbalance at the respective bearings and having phase positions indicative of the angular position of the unbalances. These electric signals of the pickups also include the effects of "noise," which so called "noise" is due to bearing roughness, building vibrations, etc.

The output of the pickups 4 and 5 is supplied to the input terminals 6 and 7, respectively, of the network N. Since the voltage generated in each pickup will be due to the unbalance in both of the arbitrarily chosen correction planes, the network N is provided to balance a part of the voltage output from the pickup 5 against the output voltage of the pickup 4 in such a way as to produce a voltage output from network N which is proportional only to the unbalance in the arbitrarily chosen correction plane nearest the pickup 4 when the reversing switch S is in the right-hand position. When the reversing switch S is in the left-hand position, the network will balance a portion of the voltage generated in pickup 4 against the unbalance generated in pickup 5 to produce a network output voltage which represents the unbalance in the arbitrarily chosen correction plane nearest the pickup 5. The network output signal will still contain the "noise" component.

The voltage across the output terminals 8 of the network N, which output voltage represents the magnitude and phase of the unbalance voltage in the arbitrarily chosen correction plane plus the "noise" signal, is applied to the input terminal 9 of the amplifier A. The amplifier may be of any one of a number of conventional types, one of which is shown. The output terminal 10 of the amplifier A is connected to the input terminal 11 of a mixer circuit M. Again a preferred type of mixer is shown, but the particular type used is not critical.

A sine-wave generator SG, having a phase adjusting vernier V, is coupled to the rotor under investigation and develops a voltage at rotational frequency. This signal is applied across the potentiometer 12 which has a tap 13 for adjusting the magnitude of the output of the sine-wave generator SG. The signal from the sine-wave generator SG is applied to another input terminal 14 of the mixer M. The resultant signal of the mixer M appears at the output terminal 15 and is applied to the input terminal 16 of the filter F. The filter circuit is sharply tuned to the rotational frequency and includes the necessary apparatus for substantially eliminating the "noise." The meter 17, receiving the output of the filter F, thus indicates only the component of the resultant signal at the rotational frequency.

For a more detailed discussion of the apparatus above briefly described, reference may be had to my copending application entitled "Electrical Balancing Machine," filed May 15, 1953, Serial No. 355,345.

By adjusting the phase vernier V of the sine-wave generator SG and by adjusting the tap 13 on the resistor 12, the amplitude and phase of the voltage applied to the mixer M is so adjusted that the meter reading of meter 17 can be nulled. When the meter 17 is nulled, the output of the sine-wave generator SG across the portion of the potentiometer, or resistor, 12 which is tapped off by the lead 13 will be an exact duplicate, free of "noise," of the fundamental component of the original unbalance signal except displaced by 180 electrical degrees. By applying the output tapped off the potentiometer 12 to a phase shifter PS, a substantially purely sinusoidal voltage wave free of "noise" and in phase with the unbalance is obtained at the input terminal of the apparatus below described. Meter 18 thus provides for an accurate measure of the magnitude of the unbalance in the selected correction plane.

Before proceeding with a further discussion of the circuitry and control, attention is called to the stroboscopic lamp SL which has heretofore not been used in the balancing field.

This stroboscopic lamp SL comprises a simple glass tube, shown in the position of an inverted U, with the electrodes 30 and 32 sealed in the ends and the tube filled with mercury vapor at a very much reduced pressure. Both electrodes are cold. The one intended to act as a cathode, namely electrode 32 is made of a material that has a lower work function than the material of the anode 30. With this type of lamp, the most brilliant flashes of light of extremely short duration are obtainable.

The flashing of this type of stroboscopic lamp is initiated by an electrical impulse of high amplitude and steep wave front applied to the electrode G disposed about the glass tube. This high voltage impulse ionizes some of the gas molecules inside the tube and starts a discharge that is self-sustaining until the anode potential is removed. After removal of the anode potential, the return of the stroboscopic lamp to non-conducting condition is more rapid than in any other stroboscopic light sources known. This high emission of light is because of its high ratio of surface to gas volume, and because ions recombine with electrons chiefly on surfaces. This type of stroboscopic tube, or lamp, can produce a 300,000 candlepower flash which lasts only 10 microseconds.

From the foregoing paragraphs describing the stroboscopic lamp, it is apparent that the lamp by reason of the amount of light produced has ideal characteristics for use with a balancing machine.

This type of stroboscopic lamp requires a triggering voltage from two to ten kv. This type of lamp, if it could be adapted for balancing machine service and similar services, has much greater stability and is thus free of external influence.

This very advantage of stability and freedom from external influence has heretofore been a deterrent to the use of this lamp in the balancing field. Pulse voltages of several kv. are difficult to generate without thyratron tubes or quite large vacuum tubes. The use of small thyratrons for triggering this type of stroboscopic lamp have been employed, but reliable operation is quite difficult to obtain when gas tubes are employed to fire other gas tubes.

The use of large vacuum tubes for generating the needed high voltage pulses is too costly for balancing machine services and similar services.

My invention avoids all these difficulties. No large expensive vacuum tubes are needed, nor is the unreliable chain of thyratron control circuitry and thyratrons needed.

The output of the phase shifter PS is supplied to the squarer S. This squarer changes the substantially sinusoidal voltage obtained from the phase shifter to a square shaped wave form having very steep wave fronts. The output of the squarer S is supplied to the input terminal 19 of the differentiating circuit including the capacitor 20 and the resistor 21. The square input wave at terminal 19 is thus changed to sharp voltage pulses as indicated by Fig. 2. These sharp voltage pulses are applied to grid 22' of the keyer tube 23 and cause the keyer tube 23 to vary in its conduction in a manner similar to the voltage pulses. This means that the small vacuum tube oscillator OS will be caused to oscillate for a time period no longer than the time period of the voltage pulse that sets it into action. The small vacuum tube oscillator normally not in action, is, in other words, held off by a fixed bias voltage.

The vacuum tube oscillator includes the energized direct current supply terminals P1 and N1, the vacuum tube 23, the timing circuit including the resistor 22 and the capacitor 24, the capacitors 25 and 26, the feedback winding 27, and, in the load circuit, the primary winding 28 of a television type 6000 volt R. F. power supply transformer TV.

The oscillator OS, producing oscillations at radio frequencies for the brief time period of the voltage pulse on grid 22', thus produces from the secondary winding 31 a high output voltage of several kv. at the firing grid G of the stroboscopic lamp SL. The lamp will thus produce a flash of light of extremely high brilliance. The discharge in the lamp SL from direct current supply terminals P and N is self-sustaining as long as the anode voltage remains up; however, since the resistor 29 has a relatively high resistance value the anode voltage on anode 30 will continue only for as long as it takes the capacitor 33 to discharge.

When the next voltage pulse appears at the grid 22' of the keyer tube 23, a second flash occurs at the stroboscopic lamp SL, and so on.

While I have shown my special firing control, for the particular stroboscopic lamp I use, in combination with a balancing machine, my invention is not limited to such an application but may be applied to any service where a cheap and reliable control is needed for firing a low pressure arc type of stroboscopic lamp. My invention is thus not limited to the showing made but includes all such modifications that fall within the spirit and scope of this invention.

I claim as my invention:

1. Apparatus for balancing rotors, in combination, means for mounting a rotor in a pair of floating bearings in which bearings the rotor is during unbalance determinations rotated at a selected speed, electric alternating current voltage producing means coupled to each of the floating bearings for producing a voltage responsive to the magnitude of the bearing vibration due to the unbalance in a rotor in a chosen correction plane substantially perpendicular to the axis of rotation of the rotor and due to other effects that affect the bearing vibration, a circuit network to which said voltage producing means are connected, said network including means adapted to change the phase and magnitude of one of said voltages associated with one bearing to produce a resultant voltage that is proportional to only the unbalance in the rotor in said chosen correction plane and such other so-called "noise effects," that is, harmonics, that affect the magnitude and character of the resultant voltage, generating means responsive to rotor rotation for generating an essentially pure fundamental sinusoidal alternating current voltage of rotational frequency, means interconnected with the output of the generating means and network for adjusting the phase position and magnitude of said fundamental sinusoidal voltage to be equal and opposite to the fundamental of said resultant voltage, whereby the fundamental sinusoidal voltage will be an indication, unaffected by any harmonics, of only the magnitude of the unbalance of the rotor in said chosen correction plane and its phase position will have a fixed relation to the position of the unbalance in the rotor in the correction plane, and means for indicating the phase of the unbalance in the chosen correction plane with respect to a reference point on the rotor in said correction plane, said last-named means comprising, a high vacuum stroboscopic lamp including a glass container, an anode constituting one principal electrode sealed in the container at one end and a cathode constituting a second principal electrode sealed in the container at the other end, a firing terminal disposed on the wall of the container at the outside of the container at a region intermediate the electrodes, and a suitable metal vapor at low pressure in the container, said electrodes being connected to a suitable source of direct current potential through a current limiting impedance, a capacitor connected directly across the electrodes, a transformer, having a primary winding and a secondary winding, having its secondary winding connected across the firing terminal and one of the principal electrodes, said transformer being of the type for producing high voltage pulses at radio frequencies on the firing terminal, an oscillator circuit, energized from a suitable source of direct current, for producing oscillations at radio frequencies, said oscillator circuit being under the control of a vacuum keyer tube, the primary winding of the transformer and impedance and capacitors, all elements being so chosen and interconnected as to produce oscillations at radio frequency in the transformer primary, said vacuum keyer tube having an anode, a cathode and a control grid, for causing the oscillator to oscillate, and means interconnected with the generating means for periodically producing from said fundamental voltage a voltage pulse across the grid and one of the principal electrodes of the keyer tube to cause the periodic firing of the stroboscopic lamp.

2. Apparatus for balancing rotors, in combination, means for mounting a rotor in a pair of floating bearings in which bearings the rotor is during unbalance determinations rotated at a selected speed, electric alternating current voltage producing means coupled to each of the floating bearings for producing a voltage responsive to the magnitude of the bearing vibration due to the unbalance in a rotor in a chosen correction plane substantially perpendicular to the axis of rotation of the rotor and due to other effects that affect the bearing vibration, a circuit network to which said voltage producing means are connected, said network including means adapted to change the phase and magnitude of one of said voltages associated with one bearing to produce a resultant voltage that is proportional to only the unbalance in the rotor in said chosen correction plane and such other so-called "noise effects," that is, harmonics, that affect the magnitude and character of the resultant voltage, generating means responsive to rotor rotation for generating an essentially pure fundamental sinusoidal alternating current voltage of rotational frequency, means interconnected with the generating means and network circuit for adjusting the phase position and magnitude of said fundamental sinusoidal voltage to be equal and opposite to the fundamental of said resultant voltage, whereby the fundamental sinusoidal voltage will be an indication, unaffected by any harmonics, of only the magnitude of the unbalance of the rotor in said chosen correction plane and its phase position will have a fixed relation to the position of the unbalance in the rotor in the correction plane, and means for indicating the phase of the unbalance in the chosen correction plane with respect to a reference point on the rotor in said correction plane, said last-named means comprising, a stroboscopic lamp including a highly evacuated glass tube containing a metal vapor, such as mercury, provided with sealed-in principal electrodes at each end and a firing terminal on the outside of the tube between the principal electrodes, said principal electrodes being connected to a source of direct-current voltage through a current limiting impedance, a capacitor connected across the principal electrodes, a vacuum tube oscillator for producing voltage pulses at a radio frequency, means for stepping these voltage pulses up to several kv., circuit means for applying the stepped-up voltage pulses to the firing terminal of said lamp, a keyer vacuum tube for causing the oscillator to oscillate, and squarer circuit means interconnected with the generating means to be energized by said fundamental voltage and connected for impressing sharp voltage pulses to the keyer tube, whereby the lamp is caused to fire during each sharp voltage pulse for a time period no longer than the sharp voltage pulse.

3. Apparatus for balancing rotors, in combination, means for mounting a rotor in a pair of floating bearings in which bearings the rotor is during unbalance determinations rotated at a selected speed, electric alternating current voltage producing means coupled to each of the floating bearings for producing a voltage responsive to the magnitude of the bearing vibration due to the unbalance in a rotor in a chosen correction plane substantially perpendicular to the axis of rotation of the rotor and due to other effects that affect the bearing vibration, a circuit network to which said voltage producing means are connected, said network including means adapted to change the phase and magnitude of one of said voltages associated with one bearing to produce a resultant voltage that is proportional to only the unbalance in the rotor in said chosen correction plane and such other so-called "noise effects," that is, harmonics, that affect the magnitude and character of the resultant voltage, generating means responsive to rotor rotation for generating an essentially pure fundamental sinusoidal alternating current voltage of rotational frequency, means interconnected with the generating means and network circuit for adjusting the phase position and magnitude of said fundamental sinusoidal voltage to be equal and opposite to the fundamental of said resultant voltage, whereby the fundamental sinusoidal voltage will be an indication, unaffected by any harmonics of only the magnitude of the unbalance of the rotor in said chosen correction plane and its phase position will have a fixed relation to the position of the unbalance in the rotor in the correction plane, and means for indicating the phase of the unbalance in the chosen correction plane with respect to a reference point on the rotor in said correction plane, said last-named means comprising, a stroboscopic lamp having a glass tube and having a pair of principal electrodes, namely, an anode sealed into the tube at one end and a cathode sealed into the tube at the other end, a metal vapor at low pressure in the tube, a control electrone on the outside surface of the tube, the lamp thus being of the type for producing brilliant light for the duration of voltage on the principal electrodes when the voltage of the control electrode in relation to one of the principal electrodes is made sufficiently high to cause ionization to take place in the tube, a capacitor connected across the principal electrodes, a current limiting resistor in series with the principal electrodes and a pair of terminals energized with a voltage of a desired value, a transformer having a primary winding and having a secondary winding connected across one of the principal electrodes and the control electrode, an electric oscillator circuit for producing alternating current of radio frequency, the output of the oscillator being connected to the transformer primary winding, said oscillator circuit including, among other elements, a relatively small vacuum tube, whereby said stroboscopic lamp is caused to fire when said oscillator is set to oscillate, and a relatively small keyer tube of the vacuum type interconnected with the oscillator circuit for causing the oscillator to oscillate, and means interconnected with the generating means for firing the keyer tube in accordance with a control signal produced from said fundamental voltage and in synchronism with said fundamental voltage to thus cause the stroboscopic lamp to fire each time the unbalance in the rotor is in proper phase relation with reference to a suitable indicating index.

4. Apparatus for balancing rotors, in combination, means for mounting a rotor in a pair of floating bearings in which bearings the rotor is during unbalance determinations rotated at a selected speed, electric alternating current voltage producing means coupled to each of the floating bearings for producing a voltage responsive to the magnitude of the bearing vibration due to the unbalance in a rotor in a chosen correction plane substantially perpendicular to the axis of rotation of the rotor and due to other effects that affect the bearing vibration, a circuit network to which said voltage producing means are connected said network including means adapted to change the phase and magnitude of one of said voltages associated with one bearing to produce a resultant voltage that is proportional to only the unbalance in the rotor in said chosen correction plane and such other so-called "noise effects," that is, harmonics, that affect the magnitude and character of the resultant voltage, generating means responsive to rotor rotation for generating an essentially pure fundamental sinusoidal alternating current voltage of rotational frequency, means interconnected with the generating means and network circuit for adjusting the phase position and magnitude of said fundamental sinusoidal voltage to be equal and opposite to the fundamental of said resultant voltage, whereby the fundamental sinusoidal voltage will be an indication, unaffected by any harmonics, of only the magnitude of the unbalance of the rotor in said chosen correction plane and its phase position will have a fixed relation to the position of the unbalance in the rotor in the correction plane, and means for indicating the phase of the unbalance in the chosen correction plane with respect to a reference point on the rotor in said correction plane, said last-named means comprising, a stroboscopic lamp having a glass tube and having a pair of principal electrodes, namely, an anode sealed into the tube at one end and a cathode sealed into the tube at the other end, a metal vapor at low pressure in the tube, a control electrode on the outside surface of the tube, the lamp thus being of the type for producing brilliant light for the duration of voltage on the principal electrodes when the voltage of the control electrode in relation to one of the principal electrodes is made sufficienly high to cause ionization to take place in the tube, a capacitor connected across the principal electrodes, a current limiting resistor in series with the principal electrodes and a pair of terminals energized with a voltage of a desired value, a high-voltage transformer for firing the stroboscopic lamp, an electric oscillator connected to energize the transformer, a keyer tube for setting the oscillation to oscillate, a squarer circuit connected to the generating means for generating said pure fundamental sinusoidal alternating current voltage, and circuit means for connecting the keyer tube to the squarer circuit.

5. Apparatus for balancing rotors, in combination, means for mounting a rotor in a pair of floating bearings in which bearings the rotor is during unbalanced determinations rotated at a selected speed, alternating current voltage producing means coupled to each of the floating bearings and each being adjusted to produce voltage pulses generally sinusoidal and in phase and proportional in magnitude with the unbalance of the rotor in an arbitrarily chosen correction plane substantially perpendicular to the axis of the rotation of the rotor and being responsive to such harmonics as may be present, and means for indicating the phase of the unbalance in the arbitrarily chosen correction plane, said last-named means including, alternating current generating means coupled to the rotor for producing a sinusoidal alternating current having a frequency equal to the voltage pulses, means for adjusting the phase and magnitude of the output of the alternating current generating means to be equal to and in phase with the fundamental of the voltage pulses, a stroboscopic lamp provided with a highly evacuated glass tube containing metal vapor, such as mercury, sealed-in principal electrodes at each end and a firing terminal at an appropriate point on the outside of the tube, a vacuum tube oscillator for producing voltage pulses at radio frequency, means for stepping this voltage up to a relatively high value, circuit means for applying the stepped-up voltage pulses across the firing terminal of said lamp and one principal electrode, a keyer vacuum tube connected to the oscillator for causing the oscillator to oscillate, and means interconnected with said voltage generating means and the keyer tube for impressing voltage pulses to the keyer tube in phase with the unbalance of the rotor in one arbitrarily chosen correction plane.

6. In a balancing machine for indicating the magnitude of unbalance and position of unbalance of a rotor, in combination, a rotor mounted to rotate in floating bearings, means for producing an alternating current voltage that is a function of both the amplitude of vibration of one bearing in accordance with the unbalance of the rotor in a chosen correction plane normal to the axis of rotation and all the harmonics in vibration that may be present, means coupled to the rotor for generating a pure fundamental sinusoidal alternating current voltage at rotational frequency, means for interconnecting the two voltage producing means and for adjusting the amplitude and phase of said fundamental voltage so that said voltages balance each other, whereby the fundamental voltage will have a magnitude proportional only to the unbalance of the rotor and will have a phase position 180° out of phase with the unbalance in the rotor in the chosen correction plane, and means for indicating the phase position of the unbalance on the rotor in the chosen correction plane with reference to a given point on the rotor in said chosen correction plane, said means comprising a phase shift circuit connected to the fundamental voltage for so shifting the fundamental voltage that the output voltage of the phase shift circuit is in phase with the unbalance, control circuit means for producing sharp voltage pulses from said output voltage in fixed phase relation to said output voltage, a keyer tube having a cathode, an anode and a control grid, connected in an oscillator circuit including a pair of terminals energized with direct current, capacitors, impedances, and the primary winding of a transformer, the keyer tube being normally biased to be non-conducting and the oscillator circuit elements being so chosen and connected that when the grid of the keyer tube is subjected to a voltage pulse to become conducting the oscillator produces an input to the transformer primary at radio frequencies for the time period of the voltage pulse on the grid of the keyer tube, a stroboscopic lamp of the type having an inverted U-shaped container, an anode sealed in the container at one end and a cathode sealed in the container at the other end, a firing terminal on the wall of the container on the outside of the container at a region intermediate the ends, said tube being highly evacuated and containing a suitable metal vapor at low pressure, the secondary winding of the mentioned transformer being connected across the firing terminal and one principal electrode, a pair of terminals energized with suitable direct current, an impedance, said impedance and principal electrodes being connected in series across said terminals, a capacitor connected directly across said principal electrodes, and circuit means for connecting the grid of the keyer tube to be energized by said sharp voltage pulses produced by said control circuit means, thereby causing the stroboscopic lamp to fire.

References Cited in the file of this patent

UNITED STATES PATENTS

| | | |
|---|---|---|
| 2,043,484 | Miller | June 9, 1936 |
| 2,092,096 | Swedlund | Sept. 7, 1937 |
| 2,165,024 | Baker et al. | July 4, 1939 |
| 2,243,379 | Johnson | May 27, 1941 |
| 2,310,092 | Knowles et al. | Feb. 2, 1943 |
| 2,315,578 | Baker | Apr. 6, 1943 |
| 2,449,651 | Hathaway | Sept. 21, 1948 |
| 2,491,342 | Townshend | Dec. 13, 1949 |
| 2,521,141 | Allen | Sept. 5, 1950 |
| 2,533,567 | Erickson | Dec. 12, 1950 |